US009380048B2

(12) United States Patent
Lindteigen et al.

(10) Patent No.: US 9,380,048 B2
(45) Date of Patent: Jun. 28, 2016

(54) CERTIFICATE AUTHORITY SERVER PROTECTION

(71) Applicants: Ty Brendan Lindteigen, Chandler, AZ (US); James Chester Jones, Chandler, AZ (US)

(72) Inventors: Ty Brendan Lindteigen, Chandler, AZ (US); James Chester Jones, Chandler, AZ (US)

(73) Assignee: SAIFE, INC. AZ (US)

( * ) Notice: Subject to any disclaimer, the term of this patent is extended or adjusted under 35 U.S.C. 154(b) by 190 days.

(21) Appl. No.: 13/928,400

(22) Filed: Jun. 27, 2013

(65) Prior Publication Data

US 2014/0108785 A1     Apr. 17, 2014

Related U.S. Application Data

(60) Provisional application No. 61/713,628, filed on Oct. 15, 2012.

(51) Int. Cl.
*H04L 29/06*     (2006.01)

(52) U.S. Cl.
CPC ................... *H04L 63/0823* (2013.01)

(58) Field of Classification Search
CPC ................................................ H04L 63/0823
USPC ......................................................... 713/156
See application file for complete search history.

(56) References Cited

U.S. PATENT DOCUMENTS

| | | | |
|---|---|---|---|
| 6,035,402 A * | 3/2000 | Vaeth et al. ........................ 726/2 |
| 6,847,951 B1 * | 1/2005 | Cordery ........... G07B 17/00193 |
| | | | 705/60 |
| 7,058,614 B1 * | 6/2006 | Wesseling et al. ............ 705/408 |
| 7,150,399 B2 * | 12/2006 | Barrus ............. G06F 17/30265 |
| | | | 235/462.01 |
| 7,209,889 B1 * | 4/2007 | Whitfield ............... G06Q 20/02 |
| | | | 705/14.39 |
| 8,108,914 B2 * | 1/2012 | Hernoud ................. G06F 21/32 |
| | | | 713/185 |
| 2002/0023220 A1 * | 2/2002 | Kaplan ........................ 713/176 |
| 2002/0029279 A1 * | 3/2002 | Campbell ............ G06Q 10/107 |
| | | | 709/229 |
| 2003/0028497 A1 * | 2/2003 | Leon ............................. 705/408 |
| 2004/0068470 A1 * | 4/2004 | Klyne ............................. 705/50 |
| 2004/0103276 A1 * | 5/2004 | Jing et al. ...................... 713/156 |
| 2005/0021474 A1 * | 1/2005 | Geist ..................... G06Q 20/341 |
| | | | 705/63 |

(Continued)

OTHER PUBLICATIONS

Sung, S., et al, 'Security Analysis of Mobile Authentication Using QR-Codes', CS & IT-CSCP, 2015, Samsung Electronics, entire document, http://airccj.org/CSCP/vol5/csit54712.pdf.*

(Continued)

*Primary Examiner* — Bradley Holder
*Assistant Examiner* — Ronald Baum

(57) ABSTRACT

This invention includes a solution to enable a digital authentication solution comprising a network. Next, a first device is coupled to the network. The first device may include an authentication key generator that is able to generate both public and private keys in electronic formats. Next, the first device is coupled to a certificate authority gateway. The certificate authority gateway includes devices capable of converting the electronically formatted public key to a non-electronic format, and vice versa. Next, the certificate authority gateway is coupled to a certificate authority server. The certificate authority server includes devices capable of converting the electronically formatted public key to a non-electronic format, and vice versa. The certificate authority server is also contained in a secure area such as a locked room, or a safe. The secure area includes features that allow the non-electronically formatted public key to be passed across the boundary of the secure area. Finally, a second device is coupled to the network.

20 Claims, 1 Drawing Sheet

(56) References Cited

U.S. PATENT DOCUMENTS

| | | | |
|---|---|---|---|
| 2005/0086140 A1* | 4/2005 | Ireland et al. .................... 705/35 |
| 2005/0096126 A1* | 5/2005 | Prasad ................ G07F 17/3248 |
| | | | 463/25 |
| 2005/0099292 A1* | 5/2005 | Sajkowsky ............. G06K 17/00 |
| | | | 340/539.13 |
| 2006/0265590 A1* | 11/2006 | DeYoung ............. H04L 9/3263 |
| | | | 713/176 |
| 2007/0016964 A1* | 1/2007 | Halcrow ................ G06F 21/78 |
| | | | 726/34 |
| 2007/0036599 A1* | 2/2007 | Piersol ............... G06K 9/00577 |
| | | | 400/76 |
| 2007/0168657 A1* | 7/2007 | Carro ........................... 713/156 |
| 2008/0091605 A1* | 4/2008 | Hughes et al. ................... 705/51 |
| 2010/0157528 A1* | 6/2010 | Schmitt ............... H05K 5/0208 |
| | | | 361/690 |
| 2010/0306544 A1* | 12/2010 | Lionetti ................. H04L 9/083 |
| | | | 713/171 |
| 2011/0029771 A1* | 2/2011 | Mehta et al. .................. 713/156 |
| 2011/0321173 A1* | 12/2011 | Weston ................ G06F 21/554 |
| | | | 726/27 |
| 2012/0005076 A1* | 1/2012 | Dessert ................ G06Q 20/10 |
| | | | 705/39 |
| 2013/0317835 A1* | 11/2013 | Mathew ................ G06Q 30/02 |
| | | | 705/2 |
| 2014/0173287 A1* | 6/2014 | Mizunuma .................... 713/176 |

OTHER PUBLICATIONS

Zhou, Z., et al, 'KISS: "Key it Simple and Secure" Corporate Key Management', InTRUST, 2013, entire document, http://www.netsec.ethz.ch/publications/papers/zhou_kiss_trust2013.pdf.*

* cited by examiner

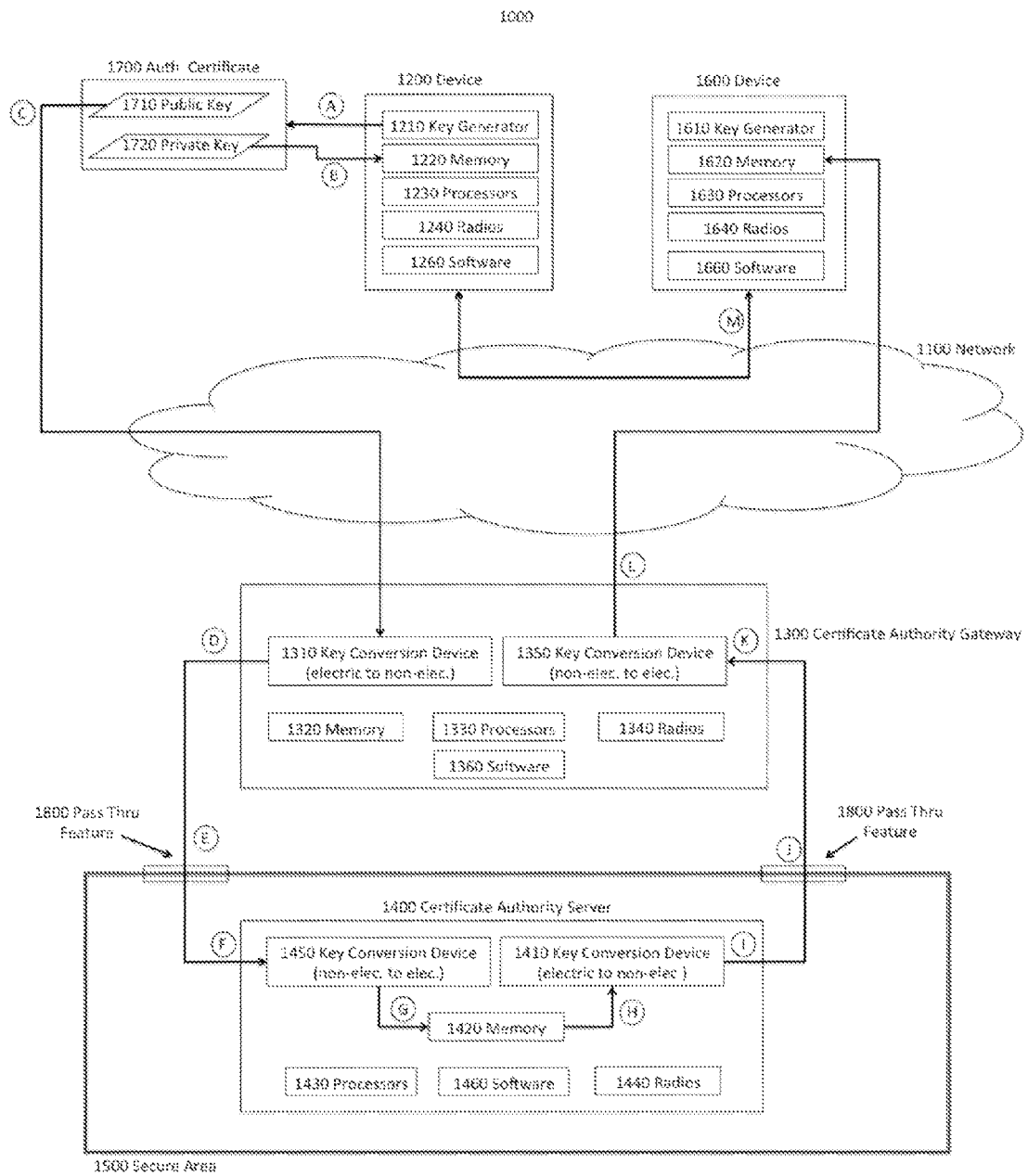

CERTIFICATE AUTHORITY SERVER PROTECTION

CROSS-REFERENCE TO RELATED APPLICATIONS

The present application is related to and claims priority from prior provisional application Ser. No. 61/713,628 filed Oct. 15, 2012 the contents of which are incorporated herein by reference.

FIELD OF THE INVENTION

This invention relates generally to the field of communications, and particularly a solution to securely authenticate devices in a network.

BACKGROUND OF THE INVENTION

Individuals, corporations, and government entities require a robust means to authenticate—identify and verify the authority—of human beings, computers, or other digital devices to access a communications or computing network. Digital certificates are often used as the means to authenticate human beings, computers, or other digital devices to access a network. For example, digital certificates are used in a number of applications that require strong authentication including online banking and high assurance communication systems.

Current authentication solutions process certificate activities, such as signing a certificate or revoking a previously signed certificate, in electronic form. Such electronic authentication solutions may include processing data packets on a network, files stored on a memory storage device—such a compact disk, or any other type of electronic format. Unfortunately these electronic authentication solutions are subject to malicious attacks that diminish the security of the certificate authority. The existing electronic authentication solutions have many other negative aspects such as their complexity, high expense, or the fact that they are always connected to the Internet. The existing electronic authentication solutions also require tight security, both physical and virtual, to protect the certificate authentication servers from malicious attacks. Thus there is a strong need for a electronic authentication solution that is more simplified, less expensive, and less vulnerable to malicious attacks when compared to existing electronic authentication solutions.

This invention provides a novel solution in which the signing certificate server is decoupled from the network. This invention enables a superior guard function that relies on manual, or automated, media conversion to process certificate activities. This invention removes all known remote attack methods while providing strong data integrity for certificate processing activities. This invention reduces the cost and complexity of physical security of the signing certificate server.

BRIEF SUMMARY OF THE INVENTION

One embodiment of the invention is a method enabling a digital authentication solution in which a device creates an authentication certificate at the edge of the network and sends the public component of the certificate to a certificate authentication server that is electronically isolated from the network. First, the device creates the authentication certificate including a public and private key both of which are in electronic formats. Next, the private key is stored in the device's secure memory and not transmitted to any other devices. Next, the public key is sent to a certificate authority system, which comprises a certificate authority gateway and certificate authority server. Next, the certificate authority gateway converts the electronically formatted public key into a non-electronic format. Next, the non-electronically formatted public key is communicated to the certificate authority server. The certificate authority server is electrically isolated from the network and stored within a secure area. Next, the certificate authority server converts the non-electronically formatted public key back to the electronically formatted public key and stores the electronically formatted public key in its memory. Next, the public key is signed by the certificate authority server. Next, the signed public key is stored in the certificate authority server's memory. Next, the signed public key is retrieved from the certificate authority server's memory. Next, the certificate authority converts the electronically formatted signed public key to a non-electronically formatted signed public key. Next, the certificate authority server communicates the non-electronically formatted signed public key out of the secure area and to the certificate authority gateway. Next, the certificate authority gateway converts the non-electronically formatted signed public key to the electronically formatted signed public key. Next, the certificate authority gateway sends the electronically formatted signed public key to the first device or alternatively to a distribution service. Next, the distribution service sends signed public keys to a second device, or the first device may directly send its signed public key to a second device. Finally, the second device may use the first device's public key, which has been signed by the certificate authority server, to establish an authenticated communicate link via the network with the first device.

Another embodiment of the invention is a system to enable a digital authentication solution comprising a network such as the internet, or a cellular 3G/4G, or any other communication network. The network comprises the devices needed to make the network secure and operational such as firewalls, routers, servers, and other computers. Next, a first device is coupled to the network. The first device includes an authentication key generator that is able to generate both public and private keys in electronic formats. The first device also includes components such as memory, processors, co-processors, and radios. Next, the first device is coupled to a certificate authority gateway. The certificate authority gateway includes a key converting device capable of converting an electronically formatted public key to a non-electronic format. In addition, the certificate authority gateway includes another key converting device capable of converting a non-electronically formatted public key back to the electronic format. The certificate authority gateway may also include components such as memory, processors, co-processors, and radios. Next, the certificate authority gateway is coupled to a certificate authority server. The certificate authority server includes a device capable of converting an electronically formatted public key to a non-electronic format. In addition, the certificate authority server includes a device capable of converting a non-electronically formatted public key back to the electronic format. The certificate authority server may also include components such as memory, processors, co-processors, and radios. The certificate authority server is also contained in a secure area such as a locked room, or a safe. The secure area includes pass thru features that allow the non-electronically formatted public key to be passed across the boundary of the secure area. For example, the safe may include clear windows that allow the non-electronically formatted pubic key to be viewed and captured by optical devices such as a scanner, monitor, or camera. Finally, a second device is coupled to the network. The second device may include an authentication key generator that is able to generate both public and private keys in electronic formats. The second device also includes components such as memory, processors, co-processors, and radios. The second device is capable of requesting the first device's signed pubic key from the certificate authority system via the network. The second device may use the first device's public key, which has been signed by the certificate authority server, to establish an authenticated communicate link via the network with the first device.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 1 is a diagram of an exemplary embodiment illustrating a digital authentication solution in which a device creates an authentication certificate at the edge of the network and sends the public key to a certificate authentication server that is electronically isolated from the network in accordance with the teachings of the present invention.

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

This invention enables a novel solution for a device to create authentication certificates on the edge of the network. The device creates an authentication certificate comprising of a public and private key. The private key always stays secured with the device, thus preventing malicious hacking attacks. Only the public key is sent to a central certificate server. The certificate authority server signs the public key and distributes it to other devices on the network. The invention includes a novel solution to isolate the certificate authority server by converting the electronically formatted public key to a non-electronically formatted key that can be communicated across a secure area physically protecting the certificate authority server.

FIG. 1 is a diagram of an exemplary embodiment for a system 1000 to enable a digital authentication solution comprising a network 1100. The network 1100 may be a wired or wireless communication network. The network 1100 may include a public or private network such as the Internet, intranet, telecommunications system, cellular 3G/4G, or other network capable of transmitting electronic data. The network 1100 may also be a secure network, in which a secure connection is established to allow the device to communicate with other devices privately. The network 1100 comprises the devices needed to make the network secure and operational such as firewalls, routers, servers, and other computers.

Next, a device 1200 is coupled to the network 1100. The device 1200 may include a smart phone, tablet PC, notebook PC, desktop PC, remote monitoring device, camera, sensor, remote controlled vehicle, or any other device that transmits data. The device 1200 may be used for any type of communication, computing, or electronic operation. The invention is applicable to both mobile and fixed devices since both types typically transmit data to and from each other via a network. The device 1200 also includes components such as memory 1220, processors 1230, and radios 1240. The device 1200 may also include software 1260 such as user-based application software, libraries, command line tools, virtual machines, and operating systems. The device 1200 also includes an authentication key generator 1210 that is able to generate both public keys 1710 and private keys 1729 in electronic formats.

Next, the device 1200 is coupled to a certificate authority gateway 1300. The certificate authority gateway 1300 may include a notebook PC, desktop PC, server, embedded computer, or any other device capable of processing and transmitting digital data. The certificate authority gateway 1300 also includes components such as memory 1320, processors 1330, radios 1340, and software 1360 required to enable the certificate authority gateway 1300 to function.

The certificate authority gateway 1300 includes a key conversion device 1310 capable of converting an electronically formatted public key to a non-electronic format. For example, the key conversion device 1310 may be a QR code creator in which the electronically formatted public key is converted to a QR code that is either printed on paper, or displayed on a monitor. In addition, the certificate authority gateway 1300 includes another key conversion device 1350 capable of converting a non-electronically formatted public key back to the electronic format. For example, this key conversion device may be a QR code reader that takes the QR code and converts it back to an electronic format.

Next, the certificate authority gateway 1300 is able to communicate to a certificate authority server 1400. The certificate authority server 1400 may include a notebook PC, desktop PC, server, embedded computer, or any other device capable of processing and transmitting digital data. The certificate authority server 1400 also includes components such as memory 1420, processors 1430, radios 1440, and software 1430 required to enable the certificate authority server 1400 to function. The certificate authority server 1400 includes a key conversion device 1410 capable of converting an electronically formatted public key to a non-electronic format. For example, the key conversion device 1410 may be a QR code creator in which the electronically formatted public key is converted to a QR code that is either printed on paper, or displayed on a monitor. In addition, the certificate authority server 1400 includes another key conversion device 1450 capable of converting a non-electronically formatted public key back to the electronic format. For example, this key conversion device 1450 may be a QR code reader that takes the QR code and converts it back to an electronic format.

The certificate authority server 1400 is also contained in a secure area 1500 such as a locked room, or a safe. The certificate authority server 1400 is isolated from the network in such a manner to prevent malicious attacks. This approach requires that only the certificate authority server 1400 be under lock-and-key and all other devices do not require physical protection. For example, the certificate authority server 1400 is not electronically or digitally connected to the certificate authority gateway 1300, or the network 1100. The secure area 1500 includes pass thru features 1800 that allow the non-electronically formatted public key to be communicated across the boundary of the secure area 1500. For example, when the safe area 1500 is a safe, the safe may include clear windows that allow the non-electronically formatted pubic key to be viewed and captured by optical devices such as a scanner, monitor, or camera. For example, this would enable the QR code printed on paper or displayed on a monitor to be read through the window by a QR reader within the secure area 1500.

The key conversion devices (1310, 1350, 1410, 1450) have been exemplified with a QR code converter and reader as the means to convert the public key to and from the electronic and non-electronic formats. However, other types of conversion techniques and devices could be used in this invention. For example, the electronic format could be converted to another non-electric visual media. Additional conversion media include other two-dimensional matrix barcodes, audio, gesture recognition, olfactory senses, chemical signatures, or quantum effect.

Finally, another device 1600 is coupled to the network 1100. The device 1600 may include a smart phone, tablet PC, notebook PC, desktop PC, remote monitoring device, camera, sensor, or any other device that transmits data. The device 1600 may be used for any type of communication, computing, or electronic operation. The device 1600 also includes components such as memory 1620, processors 1630, and radios 1640. The device 1600 may also include software 1660 such as user-based application software, libraries, command line tools, virtual machines, and operating systems. The device 1600 may also include an authentication key generator 1610 that is able to generate both public and private keys in electronic formats.

The other device 1600 is capable of requesting the first device's 1200 signed pubic key from the certificate authority gateway 1300 and certificate authority server 1400 via the network 1100. The second device 1600 may use the first device's 1200 public key, which has been signed by the certificate authority server 1400, to establish an authenticated communicate link via the network 1100 with the first device 1200.

Another embodiment of the invention is a method enabling a digital authentication solution in which a device 1200 creates an authentication certificate 1700 at the edge of the network 1100 and sends the public key 1710 to a certificate authentication server 1400 that is electronically isolated and protected from the network 1100. First, referring to FIG. 1 (A), the device 1200 creates the authentication certificate 1700 including a public key 1710 and private key 1720 both of which are in electronic formats.

Next, referring to FIG. 1 (B), the private key 1710 is stored in the device's memory 1220 and not transmitted to any other devices. The device's memory 1220 may include volatile and non-volatile memory such as flash, cache, RAM, ROM, solid state drives, hard disk drives, or secondary memory such as tape, magnetic disks and optical discs. Ideally, the private key 1710 would be stored in persistent memory so that the data is not lost when the device 1200 is powered off.

Next, referring to FIG. 1 (C), the public key 1710 is sent to a certificate authority system, which comprises a certificate authority gateway 1300 and a certificate authority server 1400. The public key 1710 is still in an electronic format and can be sent to the certificate authority gateway 1300 via the network 1100 either wired or wirelessly. The wireless communication is facilitated by the device's 1200 radios 1240 and the certificate authority gateway's 1350 radios 1340.

Next, referring to FIG. 1 (D), the certificate authority gateway 1300 uses a key conversion device 1310 to convert the electronically formatted public key into a non-electronic format. The electronically formatted public key is converted to some other non-electronic data format that is reversible. For example, the key conversion device 1310 may be a QR code creator in which the electronically formatted public key is converted to a QR code that is either printed on paper, or displayed on a monitor.

Next, referring to FIG. 1 (E), the non-electronically formatted public key is communicated to the certificate authority server 1400. The certificate authority server 1400 is electrically isolated from the network 1100 and stored within a secure area 1500 such as a locked room, or a safe. The secure area 1500 includes pass thru features 1800 that allow the non-electronically formatted public key to be communicated across the boundary of the secure area 1500. For example, when the safe area 1500 is a safe, the safe may include clear windows that allow the non-electronically formatted pubic key to be viewed and captured by optical devices such as an image sensor, scanner, monitor, or camera.

Next, referring to FIG. 1 (F), the certificate authority server 1400 converts the non-electronically formatted public key back to the electronically formatted public key. For example, the QR code could be printed on paper or displayed on a monitor outside of the secure area 1500 and read through the pass thru feature 1800 (i.e. window) by a key conversion device 1450 (i.e. QR reader) and converted back to an electronic format.

Next, referring to FIG. 1 (G), the electronically formatted public key is stored in its memory 1420. The memory 1420 may include volatile and non-volatile memory such as flash, cache, RAM, ROM, solid state drives, hard disk drives, or secondary memory such as tape, magnetic disks and optical discs. Ideally, the electronically formatted public key would be stored in persistent memory so that the data is not lost if the certificate authority server 1400 is powered off. Next, the public key is signed by the certificate authority server. Next, the signed public key is stored in the certificate authority server's memory.

Next, referring to FIG. 1 (H), when the key is requested from the requesting device (i.e. 1200) and, or to the distribution service 1900, the certificate authority server 1400 retrieves the electronically formatted signed public key from its memory 1420.

Next, referring to FIG. 1 (I), the certificate authority server 1400 uses a key conversion device 1410 to convert the electronically signed formatted public key into a non-electronic format. The electronically formatted signed public key is converted to some other non-electronic data format that is reversible. For example, the key conversion device 1410 may be a QR code creator in which the electronically formatted signed public key is converted to a QR code that is either printed on paper, or displayed on a monitor.

Next, referring to FIG. 1 (J), the certificate authority server communicates the non-electronically formatted signed public key out of the secure area and to the certificate authority gateway. For example, the QR code could be printed on paper or displayed on a monitor inside the secure area 1500 and read through the pass thru feature 1800 (i.e. window) by a key conversion device 1350 (i.e. QR reader). Next, referring to FIG. 1 (K), the certificate authority gateway converts the non-electronically formatted signed public key to the electronically formatted signed public key. For example, a QR code reader could read the printed or displayed QR code inside the secure area 1500 via the pass thru feature 1800 (i.e. window) and convert the non-electronically formatted signed public key back to an electronic format.

Next, referring to FIG. 1 (L), the certificate authority gateway 1300 sends the electronically formatted signed public key to the first device 1200 or alternatively to a distribution service 1900—referring to FIG. 1 (L'). Next, the distribution service 1900 sends signed public key to the second device 1600, or the first device 1200 may directly send its signed public key to the second device 1600. The electronically formatted signed public key is again in an electronic format and can be sent to the device 1600 and, or to the distribution service 1900 via the network 1100 either by wired or wireless connection. The wireless communication is facilitated by the device's 1600 radios 1640 and the certificate authority gateway's 1300 radios 1340.

Finally, referring to FIG. 1 (M), the second device 1600 may use the first device's public key 1710, which has been signed and verified by the certificate authority server 1400, to establish an authenticated communicate link via the network 1100 with the first device 1200. The first device 1200 will recognize its public key and thus know that the second device 1600 is a trusted device. Hence, the two devices will be able to communicate with each other with confidence that the devices are mutually trustworthy.

Throughout this description, references were made to components of the system coupled together in a manner that allows the exchange and interaction of data, such that the operations and processes described may be carried out. For example, the components may be coupled with electrical circuitry, or through wireless networks that allow the devices to transfer data, receive power, execute the operations described, and provide structural integrity. The invention may also be enabled with more components than described in the specification. For example, any number and combination of devices, networks, certificate authentication gateways, certificate authentication servers, and key conversion devices may be utilized to enable and scale out this invention.

The terms and expressions, which have been employed herein, are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method enabling authentication over a communication network comprising:
   creating by a first device an authentication certificate including an electronically formatted public key and an electronically formatted private key;
   storing by the first device the electronically formatted private key in a memory of the first device;
   sending by the first device the electronically formatted public key to a certificate authority gateway;
   converting by the certificate authority gateway the electronically formatted public key into a non-electronically formatted public key;
   sending by the certificate authority gateway the non-electronically formatted public key to a certificate authority server, wherein the certificate authority server is electrically and physically isolated from the certificate authority gateway via a boundary of a secure area;
   converting by the certificate authority server the non-electronically formatted public key back to the electronically formatted public key and storing by the certificate authority server the electronically formatted public key in a memory of the certificate authority server;
   signing by the certificate authority server the electronically formatted public key to produce a signed electronically formatted public key;
   storing by the certificate authority server the signed electronically formatted public key in the memory of the certificate authority server;
   retrieving by the certificate authority server the signed electronically formatted public key from the memory of the certificate authority server and converting by the certificate authority server the signed electronically formatted public key to a signed non-electronically formatted public key;
   sending by the certificate authority server the signed non-electronically formatted public key to the certificate authority gateway;
   converting by the certificate authority gateway the signed non-electronically formatted public key to the signed electronically formatted public key;
   sending by the certificate authority gateway the signed electronically formatted public key to a distribution service;
   sending by the distribution service the signed electronically formatted public key to a second device, wherein the second device uses the signed electronically formatted public key in establishing an authenticated communicate link via the communication network with the first device; and
   wherein communicating by the certificate authority gateway the non-electronically formatted public key across the boundary of the secure area to the certificate authority server, and communicating by the certificate authority server the signed non-electronically formatted public key across the boundary of the secure area to the certificate authority gateway, said communications via a non-electrical communication format to prevent any electronic attacks on the certificate authority server.

2. The method of claim 1, wherein the memory of the first device is a persistent memory.

3. The method of claim 1, wherein the non-electronically formatted public key is a QR code displayed on a physical medium including printed on paper or displayed on a monitor.

4. The method of claim 1, wherein sending by the certificate authority gateway the signed electronically formatted public key directly to the first device, and sending by the first device the signed electronically formatted public key directly to the second device, bypassing the distribution service.

5. The method of claim 1, wherein the secure area includes a pass thru feature that allows the non-electronically formatted public key to be communicated across the boundary of the secure area.

6. The method of claim 1, wherein the secure area comprises a physically isolated area including a locked room, or a safe.

7. The method of claim 1, wherein the secure area includes a clear window that allows the non-electronically formatted pubic key to communicate across the boundary of the secure area via the non-electrical communication format including to be viewed and captured by an optical device.

8. The method of claim 1 wherein a public key in an electronic format is converted to a public key detectable in a non-electrical communication format including at least one of an acoustic signal, a physical motion, an olfactory sense, a chemical signature, or a quantum effect.

9. A system to enable authentication over a communication network comprising:
   a first computing device creating an authentication certificate including an electronically formatted public key and an electronically formatted private key;
   the communication network;

the first computer device coupled to the communication network;

the first computer device coupled to a certificate authority gateway;

the certificate authority gateway coupled to a certificate authority server, wherein the certificate authority server is electrically and physically isolated from the certificate authority gateway via a boundary of a secure area;

a second computer device coupled to the communication network, wherein the second computer device requests a signed pubic key of the first computer device from the certificate authority server via the communication network, and uses the signed public key of the first computing device, which has been signed by the certificate authority server, to establish an authenticated communicate link via the communication network with the first computing device;

wherein the certificate authority gateway communicates a non-electronically formatted public key across the boundary of the secure area to the certificate authority server, and the certificate authority server communicates a signed non-electronically formatted public key across the boundary of the secure area to the certificate authority gateway, said communications via a non-electrical communication format to prevent any electronic attacks on the certificate authority server.

10. The system of claim 9, wherein the communication network comprises wired and wireless public and private network including Internet, intranet, telecommunications system, cellular network, or other network capable of transmitting electronic data.

11. The system of claim 9, wherein the secure area includes a pass thru feature that allows a non-electronically formatted public key to pass across a boundary of the secure area.

12. The system of claim 9, wherein the first computing device, the second computing device, the certificate authority gateway, and the certificate authority server comprise a smart phone, a tablet PC, a notebook PC, a desktop PC, a remote monitoring device, a cameras, sensor, a remote controlled vehicle, or any other device that processes and transmits data.

13. The system of claim 9, wherein the first computing device, the second computing device, the certificate authority gateway, and the certificate authority server comprise components including memory, processors, and radios, and software including a user-based application software, a library file, a command line tool, a virtual machine, and an operating system.

14. The system of claim 9, wherein the first computing device and the second computing device include an authentication key generator that generates both a public key and a private key each in an electronic format.

15. The system of claim 9, wherein the certificate authority gateway and the certificate authority server include a key conversion logic that converts an electronically formatted public key to a non-electronically formatted public key and converts the non-electronically formatted public key back to the electronically formatted public key.

16. The system of claim 15, wherein the key conversion logic comprises a QR code writer-reader in which the electronically formatted public key is converted to a QR code that is written on a paper or displayed on a monitor and a QR code reader that takes the QR code and converts the QR code back to an electronically format public key.

17. The system of claim 9, wherein the secure area includes a locked room or a safe.

18. The system of claim 17, wherein the secure area includes a pass thru feature that allows non-electronically formatted public key to be communicated across a boundary of the secure area.

19. The system of claim 18, wherein the secure area includes a clear window that allows the non-electronically formatted pubic key to communicate across the boundary of the secure area via the non-electrical communication format including to be viewed and captured by an optical device.

20. A non-transitory computer-readable medium which stores a set of instructions which when executed performs a method for enabling authentication over a communication network comprising:

creating by a first device an authentication certificate including an electronically formatted public key and an electronically formatted private key;

storing by the first device the electronically formatted private key in a memory of the device;

sending by the first device the electronically formatted public key to a certificate authority gateway and converting by the certificate authority gateway the electronically formatted public key into a non-electronically formatted public key;

sending by the certificate authority gateway the non-electronically formatted public key to a certificate authority server and converting by the certificate authority server the non-electronically formatted public key back to the electronically formatted public key and storing by the certificate authority server the electronically formatted public key in a memory of the certificate authority server, wherein the certificate authority server is electrically and physically isolated from the certificate authority gateway via a boundary of a secure area;

signing by the certificate authority server the electronically formatted public key to produce a signed electronically formatted public key and storing by the certificate authority server the signed electronically formatted public key in the memory of the certificate authority server;

retrieving by the certificate authority server the signed electronically formatted public key from the memory of the certificate authority server and converting by the certificate authority server the signed electronically formatted public key to a signed non-electronically formatted public key;

sending by the certificate authority server the signed non-electronically formatted public key to the certificate authority gateway and converting by the certificate authority gateway the signed non-electronically formatted public key back to the signed electronically formatted public key;

sending by the certificate authority gateway the signed electronically formatted public key to a distribution service; and sending by the distribution service the signed electronically formatted public key to a second device, wherein the second device uses the signed electronically formatted public key in establishing an authenticated communicate link via the communication network with the first device; and wherein communicating by the certificate authority gateway the non-electronically formatted public key across the boundary of the secure area to the certificate authority server, and communicating by the certificate authority server the signed non-electronically formatted public key across the boundary of the secure area to the certificate authority gateway, said communications via a non-electrical communication format to prevent any electronic attacks on the certificate authority server.

\* \* \* \* \*